US011318586B2

(12) United States Patent
Batsa et al.

(10) Patent No.: US 11,318,586 B2
(45) Date of Patent: May 3, 2022

(54) ELECTRICALLY ISOLATED TOOL WITH FAILSAFE COATING

(71) Applicant: APEX BRANDS, INC., Apex, NC (US)

(72) Inventors: Stephen M. Batsa, Lexington, SC (US); Chad Aaron Miley, Camden, OH (US); James Spaulding, Lexington, SC (US); Rolf DeSwardt, Blythewood, SC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 17/600,902

(22) PCT Filed: Feb. 13, 2020

(86) PCT No.: PCT/US2020/018041
§ 371 (c)(1),
(2) Date: Oct. 1, 2021

(87) PCT Pub. No.: WO2020/205070
PCT Pub. Date: Oct. 8, 2020

(65) Prior Publication Data
US 2022/0088751 A1 Mar. 24, 2022

Related U.S. Application Data

(60) Provisional application No. 62/828,670, filed on Apr. 3, 2019.

(51) Int. Cl.
*B25B 13/06* (2006.01)
*F16D 1/10* (2006.01)
*B25B 23/00* (2006.01)

(52) U.S. Cl.
CPC .............. *B25B 13/06* (2013.01); *F16D 1/101* (2013.01); *B25B 23/0035* (2013.01); *F16D 2001/103* (2013.01)

(58) Field of Classification Search
CPC ....... B25B 13/06; B25B 13/065; B25B 13/00; B25B 13/48; B29C 45/0001; F16D 1/101;
(Continued)

(56) References Cited

U.S. PATENT DOCUMENTS

| 5,970,826 A | 10/1999 | Iwinski et al. |
| 6,295,904 B1 | 10/2001 | Webb |

(Continued)

FOREIGN PATENT DOCUMENTS

| CN | 103380307 A | 10/2013 |
| DE | 202018102624 U1 | 5/2018 |

(Continued)

OTHER PUBLICATIONS

International Search Report and Written Opinion from related international application PCT/US2020/018041, dated May 4, 2020, all pages cited in its entirety.

*Primary Examiner* — David B. Thomas
(74) *Attorney, Agent, or Firm* — Burr & Forman, LLP

(57) ABSTRACT

An electrically isolated coupler includes a drive body, a driven body, an insulating member and an isolation coating. The drive body is made of first metallic material and has a drive end configured to interface with a fastening component. The drive body includes a first interface portion and the driven body includes a second interface portion. The driven body is made of a second metallic material and has a driven end configured to interface with a driving tool. The insulating member is molded to fit between the drive body and the driven body to electrically isolate the drive body and the driven body from each other. The isolation coating is disposed on a surface of the first interface portion or the second interface portion that contacts the insulating member and faces the second interface portion or the first interface portion, respectively. The isolation coating includes a mate- (Continued)

rial that adheres to metal and has a dielectric strength of greater than about 10 kV.

20 Claims, 5 Drawing Sheets

(58) Field of Classification Search
CPC ........ F16D 2001/103; F16D 3/00; F16D 3/64; F16D 3/68
See application file for complete search history.

(56) References Cited

U.S. PATENT DOCUMENTS

| | | | |
|---|---|---|---|
| 9,863,191 B1* | 1/2018 | Ide | E21B 4/003 |
| 10,435,954 B1* | 10/2019 | Ide | E21B 17/03 |
| 10,675,738 B2* | 6/2020 | Heitkamp | B25B 13/06 |
| 10,753,159 B1* | 8/2020 | Ide | E21B 4/02 |
| 10,906,161 B2* | 2/2021 | Xu | F16D 3/76 |
| 11,027,400 B2* | 6/2021 | Raskin | F16D 3/64 |
| 2009/0095138 A1 | 4/2009 | Lin | |

FOREIGN PATENT DOCUMENTS

| | | |
|---|---|---|
| DE | 102018118335 A1 | 1/2020 |
| WO | 2018204468 A1 | 11/2018 |

\* cited by examiner

ELECTRICALLY ISOLATED TOOL WITH FAILSAFE COATING

CROSS REFERENCE TO RELATED APPLICATION

This application claims priority to U.S. provisional application No. 62/828,670 filed Apr. 3, 2019, the entire contents of which are hereby incorporated by reference in its entirety.

TECHNICAL FIELD

Example embodiments generally relate to driving devices such as socket tools, bit holders and other fastener driving components. In particular, example embodiments relate to an electrically isolated coupling and a failsafe coating that can be used with such driving components to enable safe use in environments where work occurs around electrically charged components.

BACKGROUND

Socket tools, such as socket wrenches, are familiar tools for fastening nuts and other drivable components or fasteners. The sockets of these tools are generally removable heads that interface with the socket wrench on one side and interface with one of various different sizes of nut or other fastener on the other side. Because high torque is often applied through these tools, and high strength and durability is desirable, the sockets are traditionally made of a metallic material such as iron or steel. However, metallic materials can also corrode or create spark or shock hazards when used around electrically powered equipment.

Although it may be possible to coat a metallic socket in a material that is non-conductive, such material is typically not suitable for coverage of either the driving end of the socket (i.e., the end that interfaces with the wrench) or the driven end of the socket (i.e., the end that interfaces with the nut or other fastener being tightened by the socket wrench) directly contacting the driving tool or fastener. In this regard, the high torque and repeated contact with metallic components would tend to wear such materials away over time and degrade the performance of the tool. Thus, it is most likely that the ends of the socket directly contacting the driving tool or fastener would remain (or revert to) exposed metallic surfaces resulting in the socket potentially conducting electricity and becoming a shock or spark hazard.

Accordingly, a number of designs had been provided for electrical isolation of sockets. However, these designs often simply provide an isolation material between opposing metal portions of the drive and driven ends. This can provide one or more weak points where the isolation material is unsupported and can fail under high torque loads. If the isolation material fails during a tightening operation, it is possible that electrical contact can be initiated between the drive and driven ends, thereby endangering personnel or equipment. As such, further isolation may be desirable.

BRIEF SUMMARY OF SOME EXAMPLES

Some example embodiments may enable the provision of a coupling device that includes a driven end and driving end that are electrically isolated via an isolation material. However, example embodiments may further include a failsafe coating that continues isolation of such parts even if contact is made if the isolation material should happen to fail. The coupling device may be used as an adaptor for driving any selected socket, bit holder, and/or the like, even if such socket/bit holder is not electrically isolated. Given that the coupling device employs electrical isolation, existing (non-electrically isolated) fastener driving components can be used in proximity to electrical components based on the isolation provided by the coupling device.

In an example embodiment, an electrically isolated coupler is provided. The electrically isolated coupler may include a drive body, a driven body, an insulating member and a isolation coating. The drive body may be made of first metallic material and have a drive end configured to interface with a fastening component. The drive body may include a first interface portion and the driven body may include a second interface portion. The driven body may be made of a second metallic material and have a driven end configured to interface with a driving tool. The insulating member may be molded to fit between the drive body and the driven body to electrically isolate the drive body and the driven body from each other. The isolation coating may be disposed on a surface of the first interface portion or the second interface portion that contacts the insulating member and faces the second interface portion or the first interface portion, respectively. The isolation coating may also include a material that adheres to metal and has a dielectric strength of greater than about 10 kV.

In another example embodiment, an electrically isolated socket may be provided. The electrically isolated socket may include a drive body, a driven body, an insulating member and a isolation coating. The drive body may be made of first metallic material and have a hex shaped socket. The drive body may include a first interface portion and the driven body may include a second interface portion. The driven body may be made of a second metallic material and have a driven end configured to interface with a driving tool. The insulating member may be molded to fit between the drive body and the driven body to electrically isolate the drive body and the driven body from each other. The isolation coating may be disposed on a surface of the first interface portion or the second interface portion that contacts the insulating member and faces the second interface portion or the first interface portion, respectively. The isolation coating may also include a material that adheres to metal and has a dielectric strength of greater than about 10 kV.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1A:
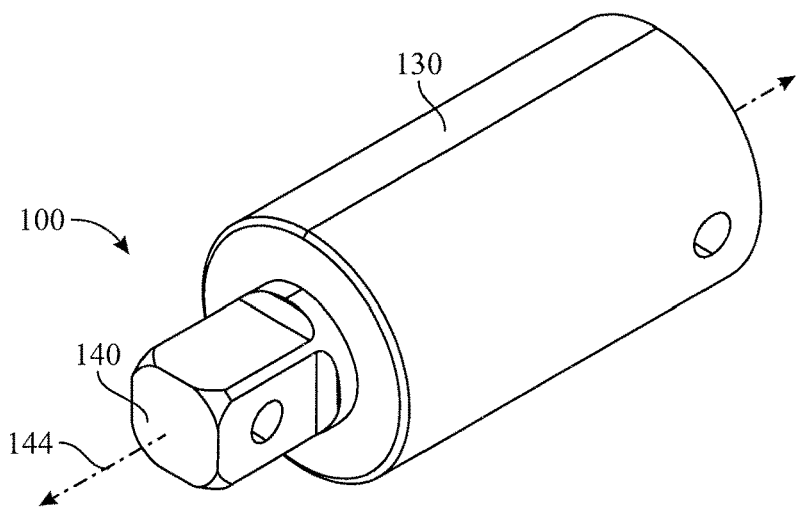
FIG. 1A is a front perspective view of an electrically isolated coupler according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of electrically isolated fastener driving tools that can be used in proximity to powered components or components that have an electrical charge. In some cases, the user can safely work on or around such components or systems without having to de-energize the system. The electrical isolation provided may eliminate the risk of surge currents traveling from a fastener to a socket tool, bit driver or other fastener driving tool (such as a socket wrench or a power tool that drives sockets, bits, etc.). Particularly for power tools that include electronic components that log data about power tool usage, the isolated coupling of example embodiments can protect valuable computer data such as recorded torque information on fasteners and run-down count history for estimating power tool life.

Example embodiments may provide a secondary electrical isolation barrier in case the primary electrical isolation barrier should fail. In this regard, as will be seen below, there are a number of specific structures that can be employed in connection with the general isolation strategy of physically separating the drive end and driven end of a coupler or adapter into a drive body and driven body, respectively, that have isolation material (e.g., non-conductive or insulating material such as, for example, nylon, molding compound, glass-fiber reinforced material, plastic composite material, etc.) positioned therebetween to prevent contact. Some of those strategies involve aligning isolated surfaces relative to one another so that there is overlap along the axial direction of surfaces on the drive body with corresponding surfaces of the driven body. These strategies can take any of a vast number of different specific forms for creating and aligning the surfaces. However, other strategies may provide physical separation between the drive body and driven body of at least a given amount that is determined based on the rated voltage for isolation and, particularly for higher voltage ratings, the resulting structures may not have any overlap in the axial direction.

In either case (i.e., designs permitting axial overlap or designs with no axial overlap), torque is transferred at least in part through the isolation material, and significant stresses can be taken in the isolation material. To the extent the torque is high enough to cause a failure in the integrity (either complete or partial) of the isolation material, the insulating characteristics of the coupler or adapter can be lost or reduced. This can leave personnel and equipment exposed to the possibility of electric shock during that failure event, particularly (but not necessarily only) if contact is made between the driven body and the drive body.

One way to provide a secondary protection means in case the isolation material should fail would be to utilize two different or distinct insulating layers. One layer could be less susceptible to cracking or breaking than the other so that when the first material cracks, the other does not. Although this method might provide enhanced protection, it comes with some drawbacks. In this regard, for example, the addition of a second layer of isolation material can substantially increase the space between the driven body and the drive body and reduce the amount of torque that the resulting coupler or adapter can transfer (for a given length) or increase the length of the coupler or adapter (for a given torque rating) to the point where its usefulness can be limited in certain contexts.

Figure 1B:
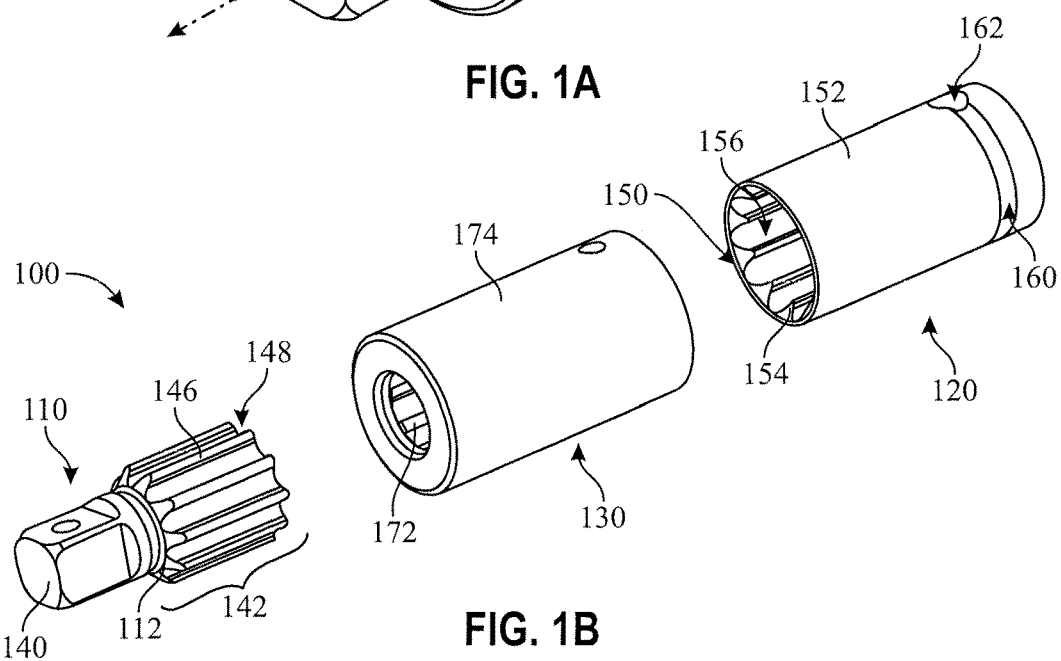
FIG. 1B is an exploded front perspective view of the electrically isolated coupler according to an example embodiment.
Figure 1C:
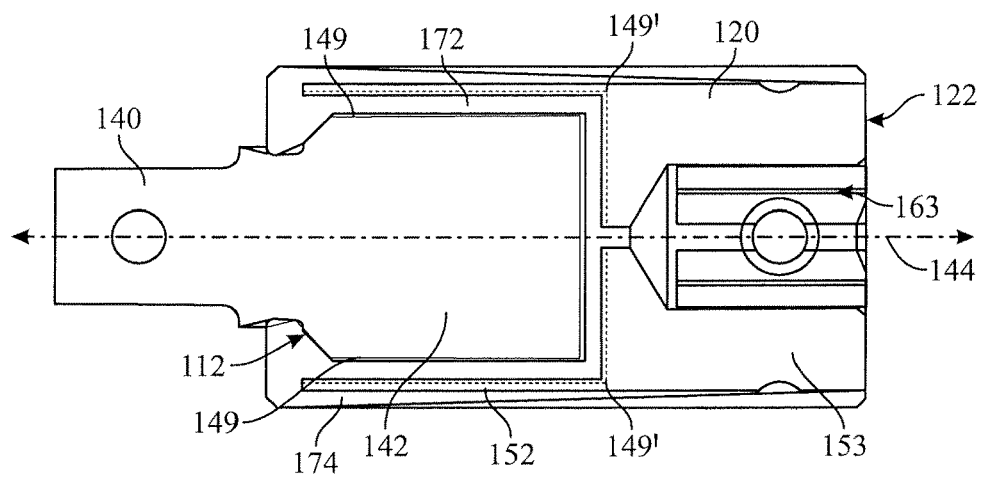
FIG. 1C is a cross section view of the electrically isolated coupler according to an example embodiment.

Accordingly, example embodiments provide an improved option for secondary protection. In this regard, for example, some example embodiments may provide for the use of an isolation coating that is applied to the surfaces of either or both of the drive body and the driven body that face each other. The isolation coating can be accomplished, for example, by dipping or plating the drive body and/or the driven body such that at least one of the surfaces that face each other is provided with a very thin layer of additional electrical isolation. Due to the thin nature of the coating material, the disadvantages in terms of torque rating reduction or tool lengthening that were described above can be avoided. Meanwhile, an effective method of secondary protection can be provided such that the coupler or adapter is configured to failsafe in the event of a material failure in the isolation material. Some structures that can employ example embodiments will now be described below by way of example and not limitation. FIG. 1A illustrates a perspective view of an electrically isolated adapter 100 according to an example embodiment, and FIG. 1B illustrates an exploded perspective view of the adapter 100. FIG. 1C illustrates a cross section view of the adapter 100 taken along the axis of rotation of the adapter (which is also the longitudinal axis of the adapter 100). As such, FIGS. 1A-1C illustrate various views of a drive body 110 and driven body 120 of the adapter 100, which can be formed by injection of insulating material between the drive body 110 and the driven body 120. Thus, in addition to the drive body 110 and the driven body 120, the adapter 100 may include an isolation assembly 130 that is configured to separate the drive body 110 from the driven body 120 and also cover substantially all of the lateral edges of the driven body 120. The drive body 110 and driven body 120 may each be made of steel or another rigid metallic material. Steel or other rigid metals generally have a low resistance to electrical current passing therethrough. The drive body 110 and the driven body 120 may be designed such that, when assembled into the adapter 100, the drive body 110 and the driven body 120 do not contact each other. The drive body 110 and the driven body 120 may be oriented such that a drive end 112 of the drive body 110 and a driven end 122 of the driven body 120 face in opposite directions. Axial centerlines of each of the drive body 110 and the driven body 120 are aligned with each other and with a longitudinal centerline of the adapter 100.

The drive body 110 may include a drive head 140, which faces away from the driven body 120 and protrudes out of the isolation assembly 130. The drive head 140 may be configured to interface with a socket, a fastener, or any other component having a receiving opening that is complementary to the shape of the drive head 140. In this example, the drive head 140 is a drive square. However, other shapes for the drive head 140 are also possible, and in some cases, the drive head 140 could be replaced with a socket. In some embodiments, a ball plunger may be disposed on a lateral side of the drive head 140 to engage with a ball detent disposed on a socket or other component.

The drive body 110 may also include drive body shaft 142 that may be configured to extend rearward from the drive head 140. Both the drive head 140 and the drive body shaft 142 may share a common axis 144, which is also the rotational and longitudinal axis of the drive body 110 and the adapter 100, when the adapter 100 is fully assembled. As can be appreciated from FIG. 1B, the drive body shaft 142 may be a splined shaft. As such, for example, a plurality of splines 146 (e.g., longitudinally extending ridges, protrusions or teeth) may extend parallel to the common axis 144 along a periphery of the drive body shaft 142. Between each of the splines 146, a longitudinally extending trench 148 may be formed. Any desirable number of splines 146 and trenches 148 could be employed in example embodiments.

The splines 146 may extend radially outward from a cylindrical core of the drive body shaft 142. The cylindrical core portion of the drive body shaft 142 may have a diameter that is about equal to a diagonal length between opposing corners of the drive head 140. The splines 146 may extend away from the cylindrical core portion by between about 5% and 25% of the diameter of the cylindrical core portion of the drive body shaft 142, and the diagonal length between opposing corners of the drive head 140. Thus, the diameter of the drive body shaft 142 may be no more than 50% larger than the diagonal length between opposing corners of the drive head 140 (and in some cases as little as 10% larger). In this example, the splines 146 and trenches 148 have a substantially sinusoidal shape when viewed in cross section. However, the splines 146 and trenches 148 could alternatively have sharper edges, if desired.

In an example embodiment, the drive body shaft 142 may be dipped, plated or otherwise treated in order to form a isolation coating 149 over all external surfaces of the splines 146 and the trenches 148. In other words, all external surfaces of the drive body shaft 142 may have the isolation coating 149 applied thereto. The isolation coating 149 is therefore applied to all surfaces of the drive body 110 that face or are adjacent to a corresponding surface of the driven body 120. Of note, the isolation coating 149 is represented in the cross section view of FIG. 1C, but the representation thereof is not intended to be to scale since the isolation coating 149 is kept very thin. For example, a thickness of the isolation coating 149 may be between about one to ten thousandths of an inch. The isolation coating 149 may be made of a material that has a relatively high dielectric strength (e.g., greater than 10 kV), and yet adheres well to steel or other metallic materials to enable the metallic material to be coated thereby. Thus, for example, the isolation coating 149 may be made of a ceramic material in some cases.

As shown in FIGS. 1B and 1C, the driven body 120 may take the form of a cylinder that has been hollowed out to at least some degree to form a drive body receiver 150. The drive body receiver 150 may be formed between sidewalls 152 (which could be considered a single tubular sidewall) of the driven body 120 that define the external peripheral edges of the driven body 120 and radially bound the drive body receiver 150. The sidewalls 152 may extend parallel to the common axis 144 away from a base portion 153. The sidewalls 152 may have longitudinally extending ridges 154 that extend inwardly from the sidewalls 152 toward the common axis 144. The ridges 154 may be separated from each other by longitudinally extending recesses 156. The ridges 154 and recesses 156 may be equal in number to the number of splines 146 and trenches 148 of the drive body 110 and may be formed to be substantially complementary thereto. However, the diameter of the drive body receiver 150 may be larger than the diameter of the drive body shaft 142 so that the ridges 154 remain spaced apart from corresponding portions of the trenches 148 and the splines 146 remain spaced apart from corresponding portions of the recesses 156.

In some cases, the driven body 120 may further include an annular groove 160 that may include a receiver 162 formed in the base portion 153. In this regard, the annular groove 160 may be formed around a periphery of the base portion 153. The annular groove 160 and/or the receiver 162 may be used for facilitating affixing the driven body 120 to the power tool or wrench that is used to drive the adapter 100 via passing of a pin through the receiver 162, or via a ball plunger being inserted into the receiver 162 as described above from a drive head of the power tool or wrench. Thus, the receiver 162 may extend through the driven body 120 (at the annular groove 160) substantially perpendicular to the common axis 144 of the adapter 100. The annular groove 160 may be provided proximate to (but spaced apart from) the driven end 122. A drive receiver 163 may also be formed in the driven end 122 to receive the drive head of the power tool or wrench that operably couples to the adapter 100. In other words, the drive receiver 163 may be formed through the base portion 153 along the common axis 144.

When the drive body 110 is inserted into the driven body 120 (as shown in FIGS. 1A and 1C), an inside surface of the sidewalls 152 may appear corrugated and complementary to an outside surface of the drive body shaft 142, which also appears corrugated, but spaced apart from the sidewalls 152 by a gap. The drive body 110 and the driven body 120 may be maintained spaced apart from each other in this manner (such that no portion of either touches any portion of the other) while an insulating material (e.g., nylon, rubber, plastic, resin, or other such materials) is injected therebetween as part of an injection molding operation. The insulating material has a high resistance to electrical current passing therethrough; in one embodiment the resistance to electrical current of the insulating material is several orders of magnitude higher than the resistance to electrical current of stainless steel. The insulating material may fill the gap and define an insulating member 172 in the form of a corrugated or fluted separator in this case. The insulating member 172 may separate the sidewalls 152 from the drive body shaft 142, and thereby also separate the splines 146 and trenches 148 from the recesses 156 and ridges 154, respectively. The insulating material of the insulating member 172 may entirely fill the gap and any other spaces between the drive body 110 and the driven body 120 within the drive body receiver 150, and may also be molded over the outside surface of the sidewalls 152 of the driven body 120 and the drive end 112 by outer molding 174. The outer molding 174 and the insulating member may combine to form the isolation assembly 130. The driven end 122 could also be covered, although some embodiments (including this example) may leave the driven end 122 uncovered. The insulating material may, once cured, form the isolation assembly 130 in order to leave only the metal of the drive head 140 and the drive receiver 163 area exposed. Although outside the scope of the present disclosure, additional components may be provided and/or designed to enable retention of the drive body 110 and driven body 120 relative to each other during the injection molding process. Accordingly, the drive body 110 and the driven body 120 may be clamped effectively in an injection molding machine during the injection molding process to ensure that the pressure stays balanced and the respective parts do not move during the injection process and result in uneven thickness of the insulating material.

The adjacent surfaces of the drive body 110 and the driven body 120 may transfer torque therebetween through the insulating member 172 (and also through the isolation coating 149). In this regard, as a torque is applied through the driven body 120, the sidewalls 152 are urged to rotate about the common axis 144. The torque is transferred to the splines 146 and trenches 148 of the drive body 110 from the recesses 156 and ridges 154, respectively, through the insulating member 172 in order to also urge the drive body 110 and the drive head 140 to turn. The drive head 140 passes the torque on to the fastener, socket, or other device to which the drive body 110 may be attached.

If the torque applied is sufficient to exceed the sheer strength of the insulating member 172, the insulating member 172 may fail to properly separate the splines 146 and trenches 148 of the drive body 110 from the recesses 156 and ridges 154, respectively, at one or more locations. As such, at least one spline 146 of the drive body 110 may be enabled to move toward contact with a corresponding at least one ridge 154 of the driven body 120. However, due to the presence of the isolation coating 149, the electrical isolation characteristics of the adapter 100 may be maintained during this failure event so that the instantaneous contact between at least one spline 146 of the drive body 110 and the corresponding at least one ridge 154 of the driven body 120 does not allow current to pass from the drive body 110 to the driven body 120. Although not required, in some cases, the recesses 156 and ridges 154 of the driven body 120 may also be coated with the isolation coating 149' as shown in dashed lines in FIG. 1C. Thus, both the drive body 110 and the driven body 120 could employ an instance of isolation coating. However, it should be appreciated that in some embodiments, only one body may need such coating. When only one body is coated, the body that is most easily coated may be the one that is selected (e.g., the drive body 110 in this example). It should therefore be appreciated that either or both of the surfaces that face each other (and overlap each other in the axial direction in this example) may be provided with the isolation coating 149/149'. Moreover, the coatings can be applied in connection with other specific structures.

Figure 2A:
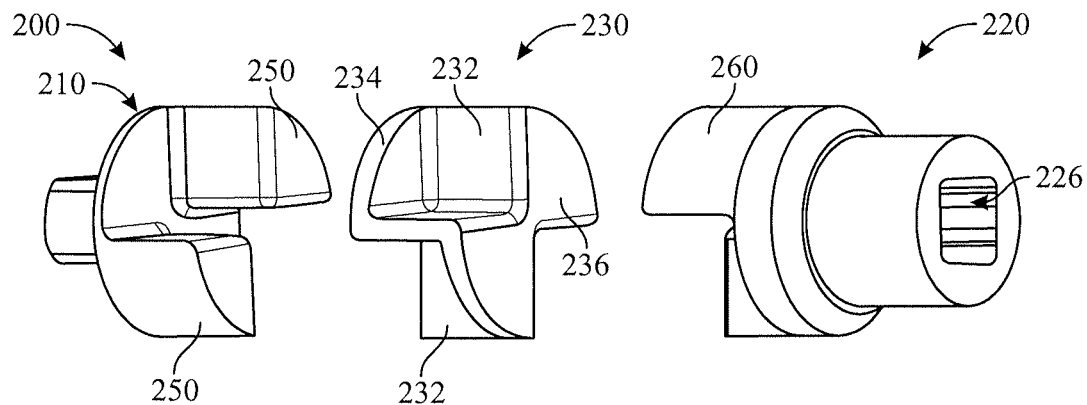
FIG. 2A is an exploded perspective view of an alternative assembled structure of an electrically isolated coupler according to an example embodiment.
Figure 2B:
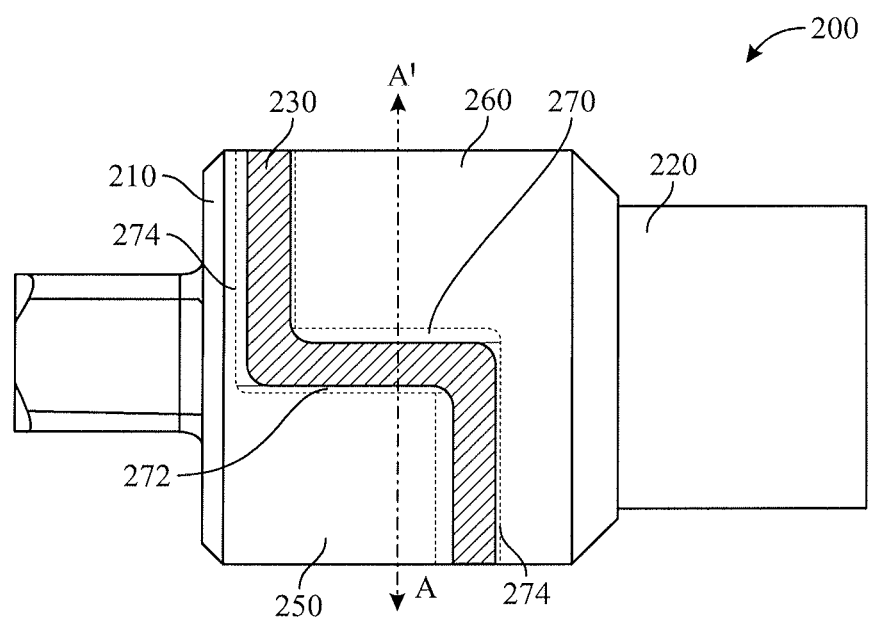
FIG. 2B is an assembled side view of the electrically isolated coupler of FIG. 2A according to an example embodiment.
Figure 2C:
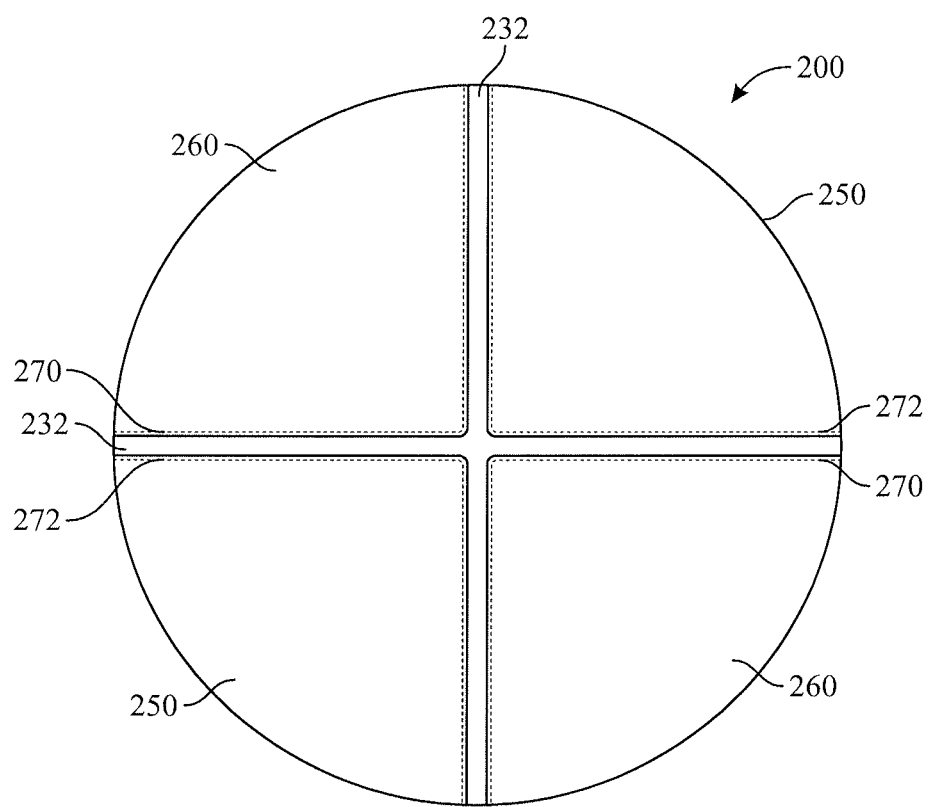
FIG. 2C is a cross section view of the electrically isolated coupler taken along line A-A' of FIG. 2B.

FIG. 2, which is defined by FIGS. 2A, 2B, and 2C, illustrates an alternative structure of an electrically isolated coupler (or adaptor) having a secondary isolation barrier provided by a isolation coating according to an example embodiment. FIG. 2A is an exploded perspective view, and FIG. 2B is a side view of the assembled structure of FIG. 2A. FIG. 2C is a cross sectional view taken along a line perpendicular to the longitudinal axis of the coupler of FIGS. 2A and 2B along line A-A' of FIG. 2B. As shown in FIG. 2, the electrically isolated coupler 200 may include a driven body 220 and a drive body 210. The driven body 220 and drive body 210 do not contact each other due to the presence of insulating member 230 therebetween. The insulating member 230 fits between an interface portion of the driven body 220 and an interface portion of the drive body 210 where the respective interface portions overlap each other along the longitudinal axis of the electrically isolated coupler 200 at least at portions thereof that face each other as they extend along the axial direction.

As can be seen in FIG. 2, a drive mating structure 226 of the driven body 220 is provided at a separate axially extended portion of the drive body 220 from the interface portion. Although the overall length of the electrically isolated coupler 200 may be increased due to this design, it should be noted that the removal of the drive mating structure 226 from the interface portion 224 may create the opportunity for increased design flexibility relative to the structure of the interface portion 224 and the insulating member 230.

In the example of FIG. 2, the interface portion of the driven body 220 and the interface portion of the drive body 210 substantially mirror each other. In this regard, the interface portion of the driven body 220 is defined by protruding members 260 that are substantially shaped as two axially extending quarter circles in opposite quadrants. Meanwhile, the interface portion of the drive body 210 is also defined by protruding members 250 that are substantially shaped as two axially extending quarter circles in opposite quadrants. Moreover, the protruding members 260 of the interface portion of the driven body 220 are in opposing quadrants relative to the protruding members 250 of the interface portion of the drive body 210.

As in the prior example, the drive body 210 and the driven body 220 are separated from each other by an isolation material that forms the insulating member 230. In particular, the insulating member 230 separates the interface portion of the driven body 220 and the interface portion of the drive body 210 from each other in both radial and axial directions to provide a complete electrical isolation therebetween. However, the insulating member 230 is also provided between axially extending faces of each of the interface portion of the driven body 220 and the interface portion of the drive body 210 to allow such faces to apply torque to both sides of the insulating member 230 between such faces. Accordingly, there is no axially extending portion of the insulating member 230 that is not supported on opposing sides thereof by respective ones of the interface portion of the driven body 220 and the interface portion of the drive body 210. Additionally, there is no cross section of the electrically isolated coupler 200 that could be taken anywhere along the axial length of the electrically isolated coupler 200 that would include only the material of the insulating member 230. As such, no weak point exists at which the material of the insulating member 230 alone could fail to damage or destroy the electrically isolated coupler 200.

As discussed above, the insulating member 230 may be formed from an insulating material (e.g., nylon, rubber, plastic, resin, or other such materials) that is injected between the drive body 210 and driven body 220 as part of an injection molding operation. In the example of FIG. 2, the insulating member 230 is therefore defined by axially extending portions 232 that separate the protruding members 250 and 260 from each other along their parallel extending faces that extend in the axial direction. The insulating member 230 also includes radially extending portions 234 and 236 that generally extend in a radial direction to separate parallel faces of distal ends of the protruding members 250 and 260 from corresponding portions of the drive body 210 and the driven body 220, respectively.

As discussed above, failure of the insulating member 230 due to excessive torque may enable opposing faces (particularly axially extending faces) of the protruding members 250 and 260 to contact each other. Accordingly, at least one (and perhaps both) of the protruding members 250 and 260 may be coated with a isolation coating as described above. In FIG. 2B, the isolation coating 270 is formed at axially extending faces of the protruding member 260 that face the corresponding axially extending faces of protruding member 250. Coating just the protruding member 260 in this manner may be sufficient to provide a secondary mode of protection in case of the failure of the insulating member 230 and contact (or a reduction in distance) the protruding members 250 that enables current (or an electrical discharge) to pass therebetween. However, it may also be possible (or even desirable) to also coat the other protruding member 250 as shown by isolation coating 272. Moreover, the isolation coating 272 could be used instead of the isolation coating 270 in some cases.

In one particular example, only axially extending faces of the protruding members 250 and 260 (and even then, only necessarily one of such faces) may be covered with the isolation coating 270 or 272. However, in other cases, the radially extending faces of either or both of the protruding members 250 and 260 (and respective opposing portions of the drive member and driven member 210 and 220) may also include isolation coatings 274. Thus, either all faces of the drive member 210 and driven member 220 that are adjacent to each other may have a isolation coating provided therebetween, or only the axially extending faces may have such coating. Additionally, either one or both of the drive member 210 and the driven member 220 may be coated.

Figure 3:
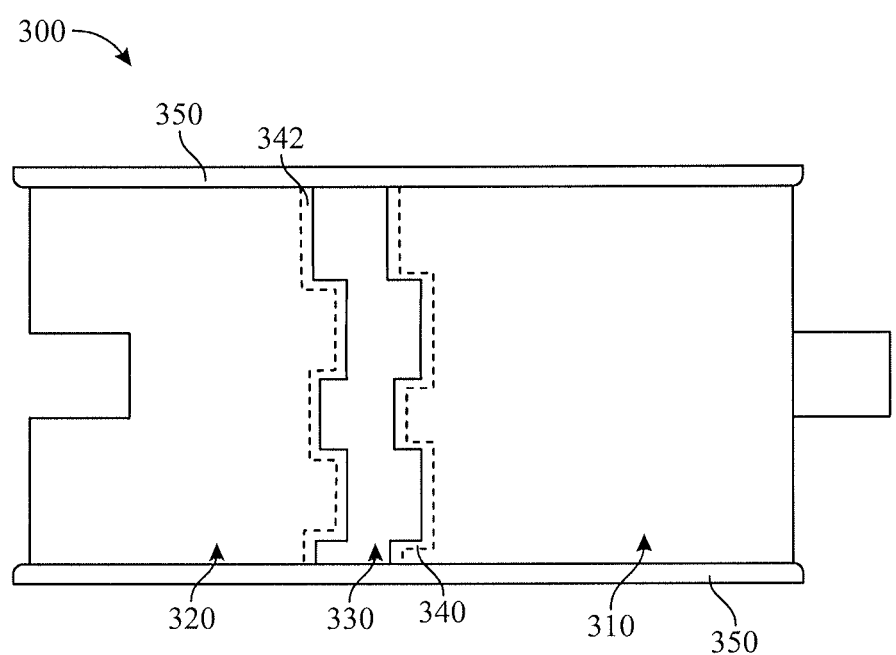
FIG. 3 is a cross section view of an alternate electrically isolated coupler according to an example embodiment.
Figure 4:
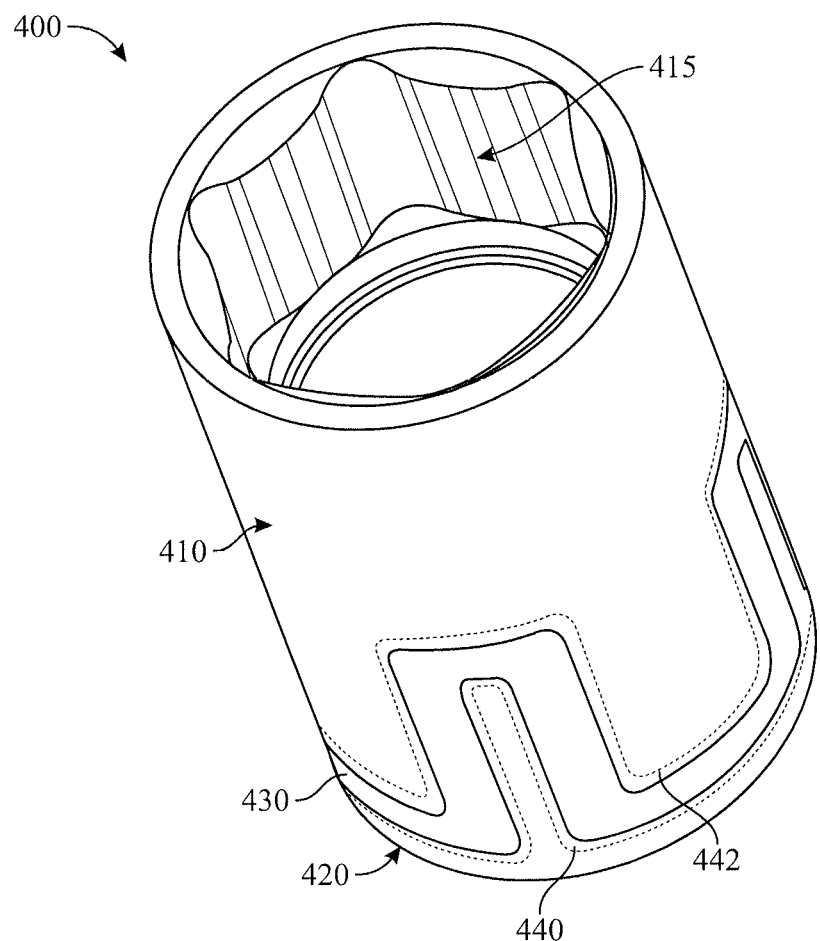
FIG. 4 illustrates a perspective view of an electrically isolated socket according to an example embodiment.

Thus, it should be appreciated that a number of different designs may be included for the insulating member, the interface portions of the drive body and the driven body, and the specific placement of the isolation coating. However, all such designs may generally provide that any cross section through the axially extending portions of the adapter or coupler where the drive body is adjacent to the driven body would include portions of both the insulating member and at least one (and sometimes two) isolation coating(s) between the interface portion of the driven body and the interface portion of the drive body. This, of course, applies when there is overlap of the drive body and the driven body along the axial direction. However, example embodiments can also be practices when no such overlap occurs. FIG. 3 illustrates a cross section view of an adapter 300 taken along the axis or longitudinal centerline of the adapter 300. As shown in FIG. 3, the drive body 310 is separated from the driven body 320 by an insulating member 330 as discussed above. However, there is no axial overlap of the drive body 310 and the driven body 320. Thus, a cross section can be taken through the adapter 300 perpendicular to the axis, and pass only through the insulating member 330. This may be advantageous for very high voltage applications where a gap between the drive body 310 and the driven body 320 must be relatively high.

As shown in FIG. 3, the drive body 310 and the driven body 320 may have corresponding interface portions (e.g., in the form of castle teeth that extend toward each other) that do not overlap axially. However, these interface portions may be considered to be adjacent to each other across the insulating member 330 (or facing each other on opposing sides of the insulating member 330). Accordingly, one or both of these interface portions may be provided with a isolation coating 340 or 342 as shown in FIG. 3. Thereafter, an overmold 350 may be formed around the structure to encapsulate the drive body 310 and the driven body 320 along with the insulating member 330. The overmold 350 may also render the insulating member 330 and the isolation coating(s) 340/342 inaccessible to the operator and other external agents or components. Accordingly, the structural integrity of the insulating member 330 and the isolation coating(s) 340/342 may be preserved by the overmold 350 thereby increasing the useful life of the adapter 300.

Although the examples of FIGS. 1, 2 and 3 generally correspond to an electrically isolated coupler that acts as an adapter to receive a male drive square at one end (i.e., the driven end) and convert to an isolated male drive square at the other end (i.e., at the drive end), other structures are also possible. In this regard, for example, the drive body could be replaced with an alternate drive body 410 that has a drive mating 415 formed as a hex socket in order to provide an electrically isolated socket 400 of a desirable size. The driven body 420 may otherwise be similar to the driven bodies described above, and the interface portions of the drive body 410 and driven body 420 may also be shaped in any of the ways described herein and other suitable ways. The insulating member 430 may be formed as described above, and function similarly as well. Similarly, a isolation coating 440 or 442 may be provided on either one or both of the interface portions of the drive body 410 and the driven body 420.

In some cases, the molding process (for the insulating member and/or the overmold or sleeve) may work to axially bind the drive body and the driven body together. However, in some cases, structural features may be provided on the interface portions of either or both of the driven body and the drive body to further facilitate retention of the entire assembly in contact with each other.

Accordingly, an electrically isolated coupler of an example embodiment may include a drive body, a driven body, an insulating member and a isolation coating. The drive body may be made of first metallic material and have a drive end configured to interface with a fastening component. The drive body may include a first interface portion and the driven body may include a second interface portion. The driven body may be made of a second metallic material and have a driven end configured to interface with a driving tool. The insulating member may be molded to fit between the drive body and the driven body to electrically isolate the drive body and the driven body from each other. The isolation coating may be disposed on a surface of the first interface portion or the second interface portion that contacts the insulating member and faces the second interface portion or the first interface portion, respectively. The isolation coating may also include a material that adheres to metal and has a dielectric strength of greater than about 10 kV. In some cases, the coupler could instead be configured as a socket when the drive end includes a hex shaped receiver.

In some embodiments, the coupler (or a socket) may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the first interface portion may include at least one axially extending portion that extends toward the driven body, and the second interface portion may include at least one axially extending portion that extends toward the drive body. The isolation coating may be applied at least to an axially extending face of the first interface portion or the second interface portion. In some cases, the isolation coating may be applied to each of the first interface portion and the second interface portion. In an example embodiment, the isolation coating may be applied both to axially extending portions and radially extending portions of each of the first interface portion and the second interface portion. In some cases, the isolation coating may be applied only to axially extending portions of each of the first interface portion and the second interface portion. In an example embodiment, the first interface portion and the second interface portion may overlap and face each other along an axial direction. In some cases, the electrically isolated coupler further includes a sleeve disposed around radial edges of the drive body, the driven body, the insulating member and the isolation coating to prevent access to the insulating member and the isolation coating. In an example embodiment, the isolation coating may include a ceramic material. In some cases, the isolation coating may have a thickness of between about one and ten thousandths of an inch, or even between about two and seven thousandths of an inch. In an example embodiment, the isolation coating may be deposited on the first interface portion or the second interface portion by dipping the first interface portion or the second interface portion in a non-conductive material that adheres to metal. In some cases, the isolation coating may be deposited on the first interface portion or the second interface portion by plating a non-conductive material onto the first interface portion or the second interface portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An electrically isolated coupler comprising:
   a drive body made of first metallic material and having a drive end configured to interface with a fastening component, the drive body comprising a first interface portion;
   a driven body made of a second metallic material and having a driven end configured to interface with a driving tool, the driven body comprising a second interface portion;
   an insulating member molded to fit between the drive body and the driven body to electrically isolate the drive body and the driven body from each other; and
   a isolation coating disposed on a surface of the first interface portion or the second interface portion that contacts the insulating member and faces the second interface portion or the first interface portion, respectively,
   wherein the isolation coating comprises a material that adheres to metal and has a dielectric strength of greater than about 10 kV.

2. The electrically isolated coupler of claim 1, wherein the first interface portion includes at least one axially extending portion that extends toward the driven body, and the second interface portion includes at least one axially extending portion that extends toward the drive body, and wherein the isolation coating is applied at least to an axially extending face of the first interface portion or the second interface portion.

3. The electrically isolated coupler of claim 2, wherein the isolation coating is applied to each of the first interface portion and the second interface portion.

4. The electrically isolated coupler of claim 3, wherein the isolation coating is applied both to axially extending portions and radially extending portions of each of the first interface portion and the second interface portion.

5. The electrically isolated coupler of claim 3, wherein the isolation coating is applied only to axially extending portions of each of the first interface portion and the second interface portion.

6. The electrically isolated coupler of claim 5, wherein the first interface portion and the second interface portion overlap and face each other along an axial direction.

7. The electrically isolated coupler of claim 1, further comprising a sleeve disposed around radial edges of the drive body, the driven body, the insulating member and the isolation coating to prevent access to the insulating member and the isolation coating.

8. The electrically isolated coupler of claim 1, wherein the isolation coating comprises a ceramic material.

9. The electrically isolated coupler of claim 1, wherein the isolation coating has a thickness of between about one and ten thousandths of an inch.

10. The electrically isolated coupler of claim 9, wherein isolation coating has a thickness of between about two and seven thousandths of an inch.

11. The electrically isolated coupler of claim 1, wherein the isolation coating is deposited on the first interface portion or the second interface portion by dipping the first interface portion or the second interface portion in a non-conductive material that adheres to metal.

12. The electrically isolated coupler of claim 1, wherein the isolation coating is deposited on the first interface portion or the second interface portion by plating a non-conductive material onto the first interface portion or the second interface portion.

13. An electrically isolated socket comprising:
    a drive body made of first metallic material and having a drive end having a hex shaped socket, the drive body comprising a first interface portion;
    a driven body made of a second metallic material and having a driven end configured to interface with a driving tool, the driven body comprising a second interface portion;
    an insulating member molded to fit between the drive body and the driven body to electrically isolate the drive body and the driven body from each other; and
    a isolation coating disposed on a surface of the first interface portion or the second interface portion that contacts the insulating member and faces the second interface portion or the first interface portion, respectively, wherein the isolation coating comprises a coating that adheres to metal and has a dielectric strength of greater than about 10 kV.

14. The electrically isolated socket of claim 13, wherein the first interface portion includes at least one axially extending portion that extends toward the driven body, and the second interface portion includes at least one axially extending portion that extends toward the drive body, and wherein the isolation coating is applied at least to an axially extending face of the first interface portion or the second interface portion.

15. The electrically isolated socket of claim 14, wherein the isolation coating is applied to each of the first interface portion and the second interface portion.

16. The electrically isolated socket of claim 15, wherein the isolation coating is applied both to axially extending portions and radially extending portions of each of the first interface portion and the second interface portion.

17. The electrically isolated socket of claim 15, wherein the isolation coating is applied only to axially extending portions of each of the first interface portion and the second interface portion.

18. The electrically isolated socket of claim 17, wherein the first interface portion and the second interface portion overlap and face each other along an axial direction.

19. The electrically isolated socket of claim 13, wherein the isolation coating comprises a ceramic material.

20. The electrically isolated socket of claim 13, wherein the isolation coating has a thickness of between about one and ten thousandths of an inch.

* * * * *